United States Patent [19]
Fowler et al.

[11] 3,783,899
[45] Jan. 8, 1974

[54] VALVE OPERATOR
[75] Inventors: John H. Fowler; Charles F. Johnson, both of Houston, Tex.
[73] Assignee: Rockwell International Corporation, Houston, Tex.
[22] Filed: Feb. 24, 1972
[21] Appl. No.: 229,229

Related U.S. Application Data

[63] Continuation of Ser. No. 72,838, Sept. 16, 1970, which is a continuation of Ser. No. 705,876, Jan. 3, 1968, which is a continuation-in-part of Ser. No. 587,892, Oct. 19, 1966.

[52] U.S. Cl. ............... 137/624.2, 137/627, 239/66, 137/635, 74/55
[51] Int. Cl. ......................................... G05b 19/06
[58] Field of Search ................ 137/624.15, 624.17, 137/624.18, 624.2, 627, 625.11, 35; 239/66; 92/31; 74/55

[56] References Cited
UNITED STATES PATENTS

| | | | |
|---|---|---|---|
| 2,180,546 | 11/1939 | Terry | 92/31 UX |
| 2,641,280 | 6/1953 | Fleischhauer | 137/624.18 X |
| 2,825,922 | 3/1958 | Murry | 137/624.18 X |
| 2,924,103 | 2/1960 | Hamilton | 137/624.2 X |
| 3,000,398 | 9/1961 | Link | 137/624.15 |
| 3,018,788 | 1/1962 | Perlis | 137/624.18 X |
| 3,369,565 | 2/1968 | Haggard | 137/625.11 |
| 3,420,270 | 1/1969 | Neyer | 137/624.18 |

*Primary Examiner*—Alan Cohan

[57] ABSTRACT

A pilot control system for selectively activating a plurality of hydraulically operated devices with power supplied from a remote source through a single conduit. The control system comprises a sequencing unit with a case enclosing a rotating and reciprocating stem. Attached to the end of the stem is an actuating plate which on rotation of the stem registers with various control devices and on reciprocating movement of the stem engages one or more of these control devices to permit pressure from the power source to activate one or more of the hydraulically operated devices. To impart rotational and reciprocal motion to the stem an annular piston is nonrotatingly and slidingly received in an annular space between the stem and case. This annular space is connected to the single conduit from the power source. The stem is provided with a continuous slot traversing its circumference and having upper and lower extremities connected by inclined channels to give a sawtooth-like appearance. The annular piston has a projection thereon which engages the stem slot. By applying pressure to the annular piston, which is spring biased against movement, the piston may be reciprocally moved causing the stem to rotate due to the slot configuration and the engaging piston projection. The stem, which is also spring biased against reciprocal motion, may then be reciprocally moved by a further increase in pressure since the piston projection lies at one extremity of the saw-tooth-like slot. Alternate increases and decreases in pressure will cause complete rotation of the stem due to the slot configuration. If it is not desired to actuate a particular control device by reciprocal movement of the stem, intermediate pressure only is used to re-register the plate engaging device, the higher pressure step, which initiates reciprocal motion, being eliminated. As previously stated, all control devices, hydraulically operated devices, and the sequencing unit are supplied with power from the remote power source through a single conduit.

19 Claims, 6 Drawing Figures

CHARLES F. JOHNSON
John H. Fowler
INVENTOR.

BY
Ned L. Conley
ATTORNEY

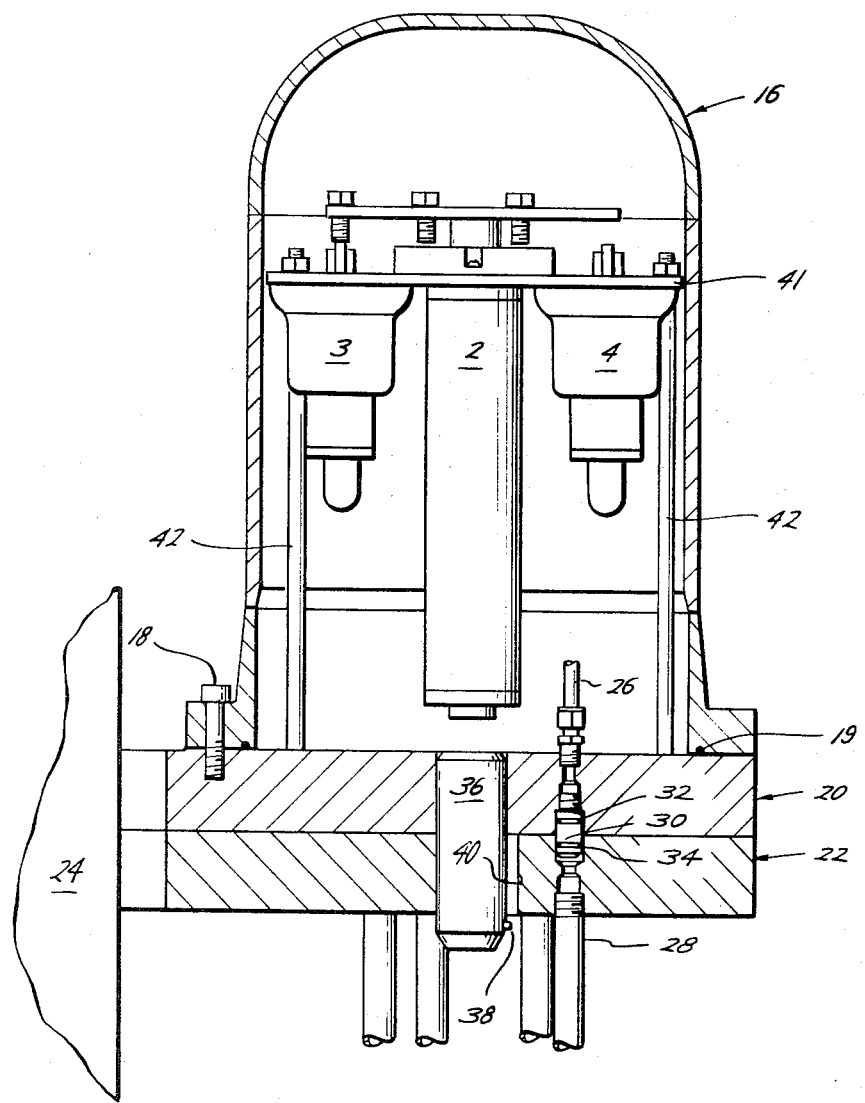

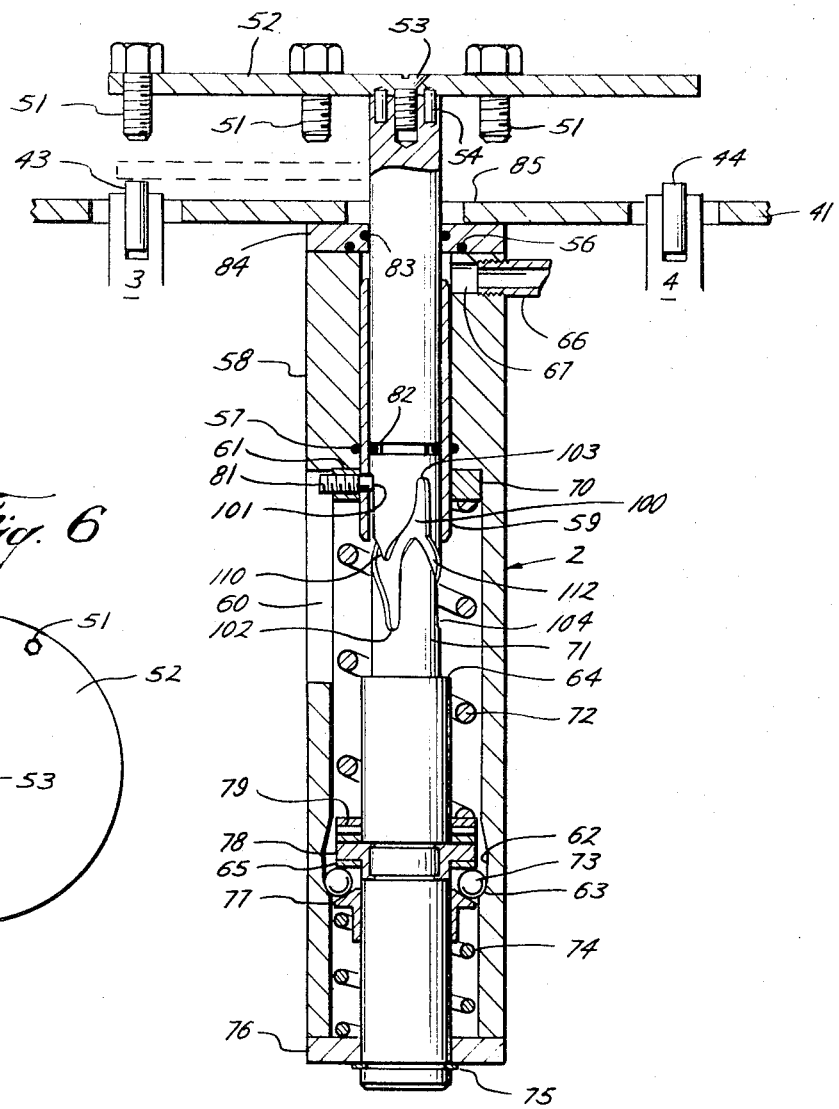
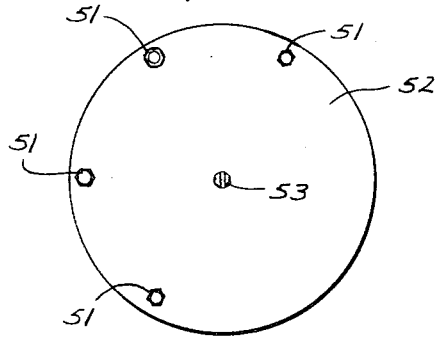
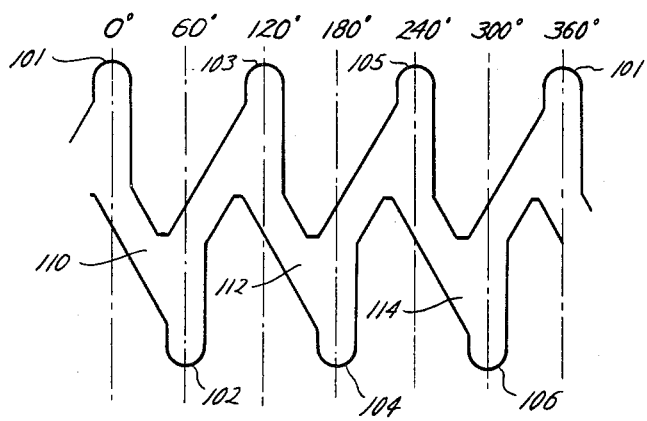
John H. Fowler
INVENTOR.

VALVE OPERATOR

CROSS-REFERENCE TO RELATED APPLICATION

This is a continuation of application Ser. No. 72,838 filed Sept. 16, 1970 which is a continuation of application Ser. No. 705,876 filed January 3, 1968 which is a continuation-in-part of application Ser. No. 587,892 filed Oct. 19, 1966.

BACKGROUND OF THE INVENTION

1. Field of the Invention

This invention relates to apparatus for causing the operation of valves which are in a location which is inaccessible to those wishing to operate the valves. It will be apparent, however, that although the apparatus specifically described herein is particularly adapted for the operation of valves, such apparatus may, within the scope of this invention, also be modified to operate other equipment.

2. Description of the Prior Art

When an oil well is completed, it is usually topped at the surface of the ground by an apparatus known as a Christmas tree, which comprises an assembly of pipe support apparatus and valves for controlling the flow of fluids to and from the well. In the normal Christmas tree, there are at least three valves for each string of tubing in the well. These three valves comprise the master valve, which is directly over the wellhead, a swabbing valve, which is usually spaced above the master valve and provides an opening through which tools may be lowered when desired for working on the well, and a wing valve which is usually positioned on a tee between the master valve and the swabbing valve and through which production from the well usually flows.

The master and swabbing valves are usually in line with the tubing string and the wing valve is off to one side. The master valve is usually left open at all times, although it is sometimes necessary to close it, as, for example, when other wellhead equipment is being repaired. The wing valve must also be opened to allow production flow therethrough, and the swabbing valve must be opened from time to time to allow work-over operations through the tubing. When opening these valves, the master valve is always opened first, then either the wing or swabbing valve is opened. In closing, the order is reversed.

In recent years, the development of underwater oil wells has been of increasing interest. In shallow water, an underwater oil well may be completed with a Christmas tree above the surface of the water, but in deeper water this is not feasible, and the Christmas tree must be positioned below the water level in a position which is normally inaccessible except by divers. Thus, it is highly desirable to provide some means for operating these valves from the surface. Often the location from which the valves must be operated may be a mile or more away from the Christmas tree.

In the past, Christmas tree valves, as well as valves for other purposes, have been operated by means of hydraulic or pneumatic actuating devices. Such devices are attached to the stem of the valve to be operated, and hydraulic or pneumatic pressure is applied thereto to cause the valve to be opened or to be closed. Since a plurality of valves is needed, it has required running a plurality of hydraulic lines from the power source. This is costly and often leads to bulky installations with concomitant space, installation and maintenance problems.

SUMMARY OF THE INVENTION

According to the present invention, apparatus is provided to cause such operation of Christmas tree valves in a remote location from a point which may be a considerable distance away. By use of the apparatus of this invention, the valves may be operated in a desired manner to desired positions, and in any desired combination of positions, by use of fluid pressure which is passed to all of the valves through a single pressure line. The pressure is supplied to a pilot control system which includes a number of control valves, a particular control valve is activated directing fluid to a selected valve operator or group of operators which in turn operate their associated valves.

In a preferred embodiment, the invention provides a sequencing unit which is connected to a hydraulic or pneumatic pressure source. On being supplied with fluid under pressure at an intermediate level a portion of the unit rotates so that an actuating means registers with at least one control valve. On being supplied at a higher pressure level a portion of the unit moves downward to actuate the control valve, which in turn directs pressure to valve operators to open any number of valves. On reduction of pressure the valves are closed, and the sequencing unit is ready for another cycle of rotation and downward movement to actuate other valves or other valves in addition to the same valves. The pilot system is so designed that all this may be done with only one line being brought from a remote pressure source for operation of the sequencing unit, control valves and the valve operators as well.

Thus, the invention provides an improved method for operating a plurality of valves or the like at a remote location through a pressure system requiring a single pressure line through which signals and power for operating a plurality of valves may be passed.

BRIEF DESCRIPTION OF THE DRAWINGS

For a better understanding of the invention reference is made to the description which follows and to the accompanying drawings wherein:

FIG. 3 is an elevation partially in section of one embodiment of the present invention and associated system components;

FIG. 4 is an elevation in section of one embodiment of the sequencing unit of the invention;

FIG. 5 is an elevation and development layout of a portion of the slotted actuator stem of FIG. 3; and FIG. 6 is a layout of the actuator plate and set screws for the embodiment of FIG. 3.

DESCRIPTION OF THE PREFERRED EMBODIMENT

Figure 1:
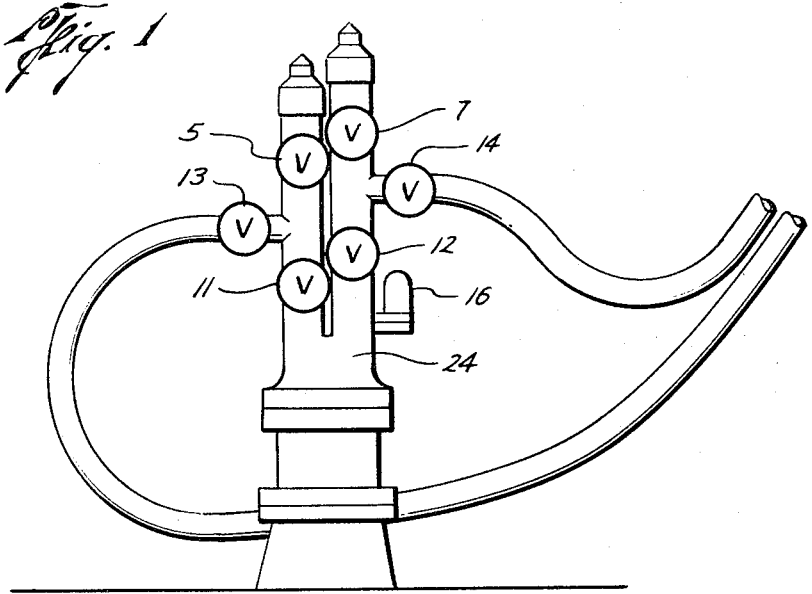
FIG. 1 is a schematic of a dual string Christmas tree showing valves and the housing enclosing the pilot control system of one embodiment of the invention.

Referring to FIG. 1, a dual string Christmas tree 24 is shown with master valves 11 and 12, wing valves 13 and 14, and swab valves 5 and 7. A sequencing unit and associated pilot system equipment are enclosed in a bubble housing 16 attached to the tree.

The pilot system to be described is used on the dual string well to operate the master and wing valves 11, 12, 13, and 14 respectively on either string or both strings simultaneously. The same principle, however, may be used to design a pilot system for operation of any number of valves on any number of strings.

Figure 2:
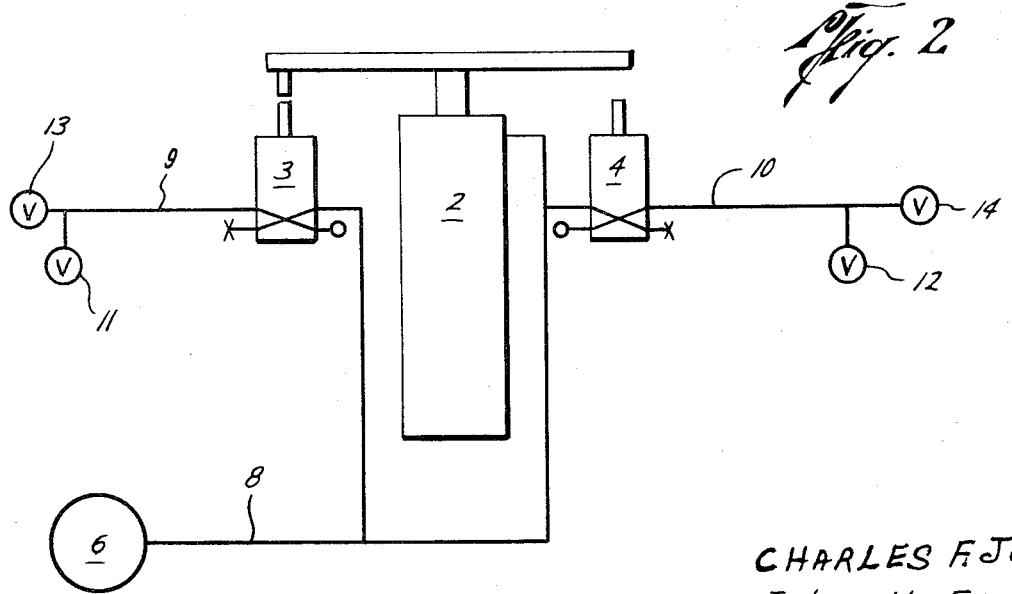
FIG. 2 is a diagram of one possible system layout of the subject invention.

Reference is now made to FIG. 2 which is a schematic drawing of the layout. A sequencing unit 2 and hydraulic control valves 3 and 4 are connected to a remote pressure source 6 by a single hydraulic line 8. Hydraulic lines 9 and 10 are connected to the valve operators of each respective string. On a proper signal from sequencing unit 2, control valves 3 or 4 or both are actuated, allowing pressure to be supplied through lines 9 and 10 to their respective valve operators. The master valves 11 and 12 and wing valves 13 and 14 of each string are representatively shown. As increased pressure is supplied to the valve operators the valves are opened. On reduction of pressure the valves are closed due to a return spring within the valve operators. In one embodiment of the invention, the return springs in the operators for wing valves 13 and 14 exert more force than the return springs of the operators for master valves 11 and 12. Thus, the master valves open before the wing valves and also close before the wing valves. Control valves 3 and 4, and the operators for valves 11, 12, 13 and 14 are standard equipment, commercially available, and will not be described in detail.

Referring to FIG. 3, the sequencing unit 2, control valves 3 and 4, and related hydraulic lines etc. are enclosed in a bubble housing 16 attached by cap screws 18 to a mounting plate 20 and sealed by O-ring 19. Mounting plate 20 is attached to base plate 22 by a quick connecton means such as swing bolts so that it may be quickly removed or attached if necessary. Base plate 22 is attached to a portion of the Christmas tree 24 by such means as brackets or weldings. Christmas tree 24 may be located underwater or any location remote to the pressure source. Hydraulic tubing to and from seqencing unit 2 and control valves 3 and 4 and hydraulic lines to operators and pressure source are joined, such as shown for tubing 26 and line 28 which are connected to mounting plate 20 and base plate 22 respectively. A nipple 30 is attached to mounting plate 20, and is partially protruding therefrom. Nipple 30 is provided with O-rings 32 and 34 so that when mounting plate 20 and base plate 22 are in abutment a fluid tight seal is attained. To assure proper alignment of the various hydraulic tubing and lines, an alignment pin 36 is provided at the center of mounting plate 20 having key pin 38 attached to the base of its exterior. Key pin 38 slides in slot 40, which is vertically machined on the interior of a hole in the center of base plate 22 to receive alignment pin 36. Thus, proper registration of all hydraulic connections is assured. Sequencing unit 2 and control valves 3 and 4 are supported on a circular plate 41 which in turn is supported by steel rods 42 attached to mounting plate 20.

Now referring to FIGS. 4, 5, and 6, a preferred embodiment of sequencing unit 2 will be described in detail. An indexing unit case 58 is attached and suspended from circular plate 41 to which control valves 3 and 4 are also attached, for example, at 180 degree intervals (See FIG. 3 also). Control valve actuating plungers 43 and 44 extend above the surface of plate 41. Indexing unit case 58, in this preferred embodiment, is made by longitudinally drilling a piece of square bar stock so that the interior thereof is generally cylindrical. Vertical slots 60 communicating with the cylindrical interior of case 58 are machined at 120° intervals for this particular embodiment. Above slots 60 the internal diameter of case 58 is reduced from that below, leaving a downwardly facing circular shoulder 61. Near the interior base of case 58 a circumferential groove 62 is provided having an upwardly facing frusto-conical shoulder 63. Near the upper portion of case 58 a pressure connection 66 is provided through which a fluid may be introduced to the interior of case 58. Passing through the cylindrical interior of case 58 is cylindrical indexing unit stem 71. Indexing unit stem 71 will be described in detail later. At each end of indexing unit case 58 cover plates 76 and 84 are provided, each having a hole through which indexing stem 71 passes. Upper cover plate 84 is provided with O-rings at 56 and 83 to prevent leakage from the interior of case 58. Indexing stem 71 projects upwardly through a hole in circular plate 41. At the upper end of stem 71 circular valve actuator plate 52 is attached by cap screw 53 and pins 54. Near the outer periphery of actuator plate 52 holes are drilled and tapped to receive set screws 51. Set screws 51 are located on actuator plate so as to register with actuating plungers 43 and 44 on the proper rotation of stem 71. Set screws 51 extend downwardly so that a downward movement of stem 71 will cause the set screws to depress either one or both of actuating plungers 43 and 44 to activate the control valves 3 and 4. The rotation and downward movement of stem 71 will be later explained.

Indexing unit stem 71 is basically a rod of two diameters, a smaller upper diameter and a larger lower diameter being joined by upwardly facing circular shoulder 64. Stem 71 is retained within case 58 by spring forces and snap ring 75. Near the center of the larger diameter of stem 71 and groove 62 a bearing retainer ring 78 is affixed. Thrust ring 65 mounted underneath retainer ring 78 is directly in contact with a plurality of ball bearings 73 which transmit an upward force from helical spring 74 to stem 71. Latch retainer ring 77 is mounted between spring 74 and the ball bearings 73. Normally, ball bearings 73 partially rest in groove 62 on the downwardly tapered upper surface of latch retainer ring 77. In the annular space between the interior of case 58 and the upper portion of stem 71 a cylindrical sleeve 59 is slidingly received. A very close fit is maintained and the upper interior of case 58 is sealed off from the larger lower interior of case 58 by O-rings at 57 and 82. Near the exterior base of sleeve 59 a guide ring 70 is provided through which half dog point set screws 81 pass perpendicularly to the axis of stem 71. Set screws 81, for this particular embodiment, are located at 120 degree intervals around guide ring 70. The points of set screws 81 ride in a slotted portion 100 of stem 71 to be later explained. The heads of set screws 81 extend into vertical slots 60 of case 58 so that guide ring 70 and set screws 81 may move vertically but may not rotate relative to the case. Mounted between bearing retainer ring 78 and guide ring 70 is another helical spring 72 which normally forces guide ring 70 against shoulder 61. Consequently, cylinder 59 is forced to its uppermost position within the annular space between stem 71 and the interior of case 58. At the base of spring 72 a thrust bearing 79 is provided to eliminate any torsional forces which otherwise might be exerted by spring 72.

Reference is now made to FIG. 5 to describe the slotted portion 100 of stem 71, shown in a development view therein. The upper extremities 101, 103, and 105 of slot 100 are located 120 degrees apart, as are lower extremites 102, 104 and 106. The upper and lower extremities are 60 degrees out of phase with each other. Therefore, three upper positions and three lower positions are provided in slot 100. Of course, other arrangements with more or less positions at different intervals may be provided. The slot 100 as shown is for the particular embodiment being described in detail. Joining upper and lower extremities of slot 100 are inclined channels 110, 112 and 114. If the point of a set screw, such as 81 of FIG. 4, were inserted in slot 100 at 101 and moved vertically downwardly a distance equal to the vertical distance between 101 and 102, stem 71, being free to rotate, would rotate 60°, due to the camming action between the point of set screw and channel 110. If the set screw were than upwardly returned to its original position, stem 71 would rotate another 60 degrees so that the point of the set screw would be resting at 103, stem 71 having rotated a total of 120 degrees from start. As can be seen, this cycle may be repeated until the shaft has been completely rotated through 360 degrees. Actually, in the embodiment shown in FIG. 4, since there are three set screws 81 at 120° intervals, if one point were at 101 there would also be set screw points at 103 and 104. However, the operational principal of slot 100 is the same as explained above.

The operation of the above-described embodiment of sequencing unit 2 will now be explained. At the beginning of a cycle the parts of sequencing unit 2 appear as in FIG. 4. The points of set screws 81 rest in the upper extremities of slot 100. On a signal from a remote location an intermediate pressure is supplied at connection 66 to the annulus 67 within case 58. Cylinder 59 acts as a piston, forcing guide ring 70 and set screws 81 vertically downward. As set screws 81 move downwardly stem 71 is rotated 60 degrees due to the configuration of slot 100 as previously described. As stem 71 is rotated, set screw 51 on actuator plate 52 becomes aligned with actuating plunger 43. When stem 71 has rotated 60 degrees, set screws 81 rest in the lower extremities of slot 100 and cylinder 59 rests against shoulder 64 on stem 71. At this point the downward force on cylinder 59 is directly transmitted to stem 71. The forces of spring 74 and shoulder 63 normal to ball bearings 73 combine to resist the downward force caused by pressure in annulus 67. Again, on signal from a remote location, pressure to annulus 67 is increased to a higher level. This causes bearings 73 to be forced inwardly along frusto-conical shoulder 63 until bearings 73 are completely free of groove 62. The resistance to downward movement is suddenly reduced to only that of spring 74. Thus, stem 71 "snaps" down and set screws 51 depress the actuating plunger on control valve 3 to activate the valves of string 1 (see FIG. 2). The purpose of ball bearings 73 and grooves 62 is to provide the downward "snap" action. This reduces throttling in control valves 3 and 4 and, therefore, reduces wear and maintanance of them. This higher pressure level is maintained as long as the valves are desired to remain open.

To close the valves of string 1, pressure is reduced to an intermediate level within annulus 67, allowing spring 74 to return stem 71 to its uppermost position. This causes set screw 51 to move away from actuating plunger 43, which in turn causes control valve 3 to effect the closing of the valves of string 1. A further reduction in pressure allows spring 72 to return cylinder 59 to its uppermost position. While moving to this position set screws 81 move to the upper extremities of slot 100, rotating stem 71 through 60 degrees. Thus, stem 71 has moved a total of 120 degrees in this cycle and is in a ready position for further cycling.

As can be understood from the foregoing discussion of this embodiment, stem 71 can be made to move downwardly three times through 360° rotation (every 120°). Thus, with proper location of set screws 51 the following functions may be attained:

1. actuation of control valve 3,
2. actuation of control valve 4,
3. actuation of both control valves 3 and 4.

Therefore, the opening of the valves on either string or both at the same time may be effected. The diagram in FIG. 6 of actuator plate 52 and set screws 51 show an arrangement for accomplishing this result. Obviously, the number of cycles and function accomplished may be varied by a modification of slot 100 and the location of set screws 51. This principle of operation, however, is the same.

As has been stated in the description of this embodiment, stem 71 may be moved downwardly in three positions to actuate a control valve. It is not necessary that each cycle be completed in order. For instance, referring to FIG. 5, suppose one of set screws 81 rests at upper extremity 101 of slot 100 and it is desired to actuate the control valve which would be actuated with that set screw at lower extremity 104 (180° from 101). It is not necessary to actuate the valve at the intermediate position corresponding to lower extremity 102. To do this, intermediate pressure is first supplied to annulus 67 (FIG. 4). Thus, stem 71 is rotated 60°. Now, instead of raising the pressure to a higher level for downward movement of stem 71, the pressure in annulus 67 is reduced. Thus, spring 72 returns cylinder 59 to its uppermost position, rotating stem 71 another 60 degrees so that the aforementioned set screw now rests at upper extremity 103 in slot 100. The pilot unit is now ready for the complete cycle of intermediate and higher pressure to actuate the valve related to position 104 in slot 100. It can, therefore, be seen that any position may be selected for activating without the necessity of activating intermediate positions.

From the foregoing discussion it is readily seen that the invention provides a pilot system for controlling the opening and closing of several valves and combinations thereof through a system comprising a single pressure line. Not only is the sequencing unit and control valve pressures obtained from the single line, but all valve operators receive their power source from the same line.

One embodiment of the invention has been described for use on an underwater well Christmas tree. Of course, its use is not limited to underwater oil and gas well valves and it may be easily adapted for many applications which require remote operation of a plurality of hydraulically operated devices through a single pressure line and it is intended that the scope of the invention include such other applications.

It can also be understood from the foregoing description that the invention can be adapted for operation of hydraulic devices through a number of pressure levels, each pressure level actually a separate hydraulic device or a combination of a plurality of these devices. This type of operation would also be performed with only a single pressure line system. Although this type of operation affords certain disadvantages and advantages not present in the described preferred embodiment, it is intended that the scope of the invention include such an operation.

Although a single embodiment of the present invention has been described in detail, many modifications and applications thereof may be made by one skilled in the art without departing from the spirit of the invention and it is intended that the present invention be limited only by the scope of the claims which follow:

We claim:

1. Apparatus for remotely operating a plurality of valves comprising:
   a remote pressure source,
   valve operators attached to a plurality of valves, control valves to control opening and closing of said valves by allowing or preventing flow from said pressure source to said valve operators,
   pilot control adapted to activate any selected one or more of said control valves without structural alteration of said pilot control and in no predetermined activation sequence with any other said control valve, and
   single conduit means connecting said remote pressure source to said valve operators and said pilot control, said pilot control and said valve operators being remotely controlled and operated only by pressure emanating from said pressure source through said single conduit means, said pilot control comprising:
   case means,
   stem means retained within said case means for axial as well as rotating movement,
   piston means within said case means,
   cooperative means on said piston means and said stem means to cause said stem means to rotate and move axially in relation to said case means on said piston means receiving pressure from said pressure source, and
   actuating means connected to said stem means to actuate said control valves on said axial movement of said stem means.

2. The combination of claim 1 in which said cooperation means on said piston means and said stem means includes:
   slot means encircling a portion of said stem means, said slot means having upper and lower extremities connected by inclined channels, said slot means traversing the circumference of said stem means, and
   slot engaging means on said piston means, a portion of said slot engaging means riding in said slot means.

3. The combination of claim 2 including:
   spring means biasing said piston means in a first direction causing said slot engaging means to be positioned at one of said upper and lower extremities of said slot means, said spring means allowing said slot engaging means to move in said inclined channels to the opposite of said upper and lower extremities causing said stem means to rotate on intermediate pressure being supplied to move said piston means, said spring means allowing said stem means to move in a second direction opposite said first direction on increase of said intermediate pressure to a higher pressure level.

4. The combination of claim 1 in which said actuating means includes a plate connected to the end of said stem means, said plate having cam means protruding therefrom at predetermined locations to actuate said control valves on said axial movements of said stem means.

5. A sequencing unit to program the actuating of valves and other devices comprising:
   a case means,
   a cylindrical stem means slidingly disposed within said case means,
   slot means encircling said stem means, said slot means having an irregular configuration so as to alternately rise and fall within the confines of a cylindrical band around said stem means,
   slot engaging means, a portion of which slidingly rides in said slot means, said slot engaging means being longitudinally movable relative to said case means,
   means operable by increase and decrease of pressure to move said slot engaging means longitudinally first one direction than another cooperating with said slot means to rotate said stem means to a plurality of predetermined positions, said means operable on further increase of said pressure to cause said stem means to be moved longitudinally relative to said case means at one or more of said predetermined positions, and
   actuating means attached to said stem means to engage said devices to be programmed on said rotational and longitudinal movement of said stem means.

6. Apparatus for remote operation of a plurality of valves in different combinations and sequences comprising:
   a remote pressure source,
   a plurality of valve operators attached to said valves,
   a plurality of control devices, each control device capable of actuating one or more of said valve operators,
   a pilot control, a portion of which may be rotated in one direction on alternating between a low pressure and an intermediate pressure level from said pressure source to align engagement means with one or more of said control devices, said portion being longitudinally movable in response to a high pressure level from said pressure source to cause said engagement means to engage said control devices for activation of said valve operators, and
   single conduit means connecting said remote pressure source to said valve operators and said pilot control.

7. The combination of claim 6 in which said rotatable portion of said pilot control is a cylindrical stem concentrically disposed within the cylindrical interior of a case leaving an annular space therebetween an annular piston being slidingly and nonrotatable disposed in a portion of said annular space, one end of said piston being exposed to pressure from said pressure source, said stem having a sawtooth like slot traversing the circumference thereof within the confines of a cylindrical band, and slot engagement means being attached to said piston, a portion of said engagement means riding in said sawtooth slot to impart rotational movement to said stem means through movement of said piston on said alternating between said low and intermediate pressure level.

8. The combination of claim 6 in which said longitudinally movable portion of said control means is a stem concentrically disposed within the interior of a case, a spring being mounted concentrically with said stem within said case, said spring having an annular ring mounted at one end thereof, said annular ring having a tapered shoulder thereon, a plurality of ball bearings being mounted adjacent said retainer ring, said ball bearings partially resting on the tapered shoulder of a groove within the interior of said case means so longitudinal movement of said stem is resisted by said spring and the normal forces of said groove transmitted through said ball bearings, said ball bearings being inwardly movable along said tapered shoulder of said groove to completely be free of said groove to cause immediate and substantial reduction of resistance to said longitudinal movement of said stem.

9. A control device comprising:
case means having a generally cylindrical interior,
cylindrical stem means slidingly retained in said case means with an annular space therebetween,
slot means completely encircling a portion of said stem means, said slot means having upper and lower extremities connected by inclined channels, said slot means traversing the circumference of said stem means,
annular piston means within a portion of said annular space between said case means and said stem means, said piston means having guide means thereon to prevent rotation of said piston means relative to said case means,
slot engaging means on said piston means, said engaging means riding in said slot means on said portion of said stem means,
spring means biasing said piston means and said slot engaging means in one direction,
pressure means sealingly connected to a portion of said annular space between said case means and said stem means to cause said piston means to move said slot engaging means from said upper extremities of said slot means through said inclined channels to said lower extremities to partially rotate and reciprocate said stem means on introduction of intermediate pressure level and to cause said stem means to further reciprocate on increase of said intermediate pressure level to a higher pressure level, and
means connected to said stem means to transmit said rotational and reciprocating movement of said stem means to devices to be controlled by said control device.

10. The combination of claim 9 in which said spring means includes:
first helical spring around a portion of said stem means between said piston means and one of said case, said first helical spring allowing said piston means to move downward in said slot means to rotate said stem means on said introduction of said intermediate pressure level,
second helical spring mounted concentrically with said stem means with a bearing retainer means adjacent thereto,
groove means within said case means having a frusto-conical shoulder therein,
latch retainer ring attached to the upper end of said second helical spring, said latch retainer ring having an upwardly converging frusto-conical surface thereon, and
ball bearing means adjacent said bearing retainer means, partially resting on said frusto-conical shoulder of said groove means, said ball bearing means to be forced inwardly of said groove along said shoulder therein to release said stem means for rapid downward movement on increase of said intermediate pressure level to a higher pressure level.

11. Apparatus comprising:
a plurality of fluid pressure operated devices,
control valve means to control the fluid for operation of said devices,
a pilot system adapted to selectively operate said control valve means to cause fluid to flow to any one of various combinations of said fluid pressure operated devices without structural rearrangement of said pilot system and without a predetermined operation sequence of any other of said fluid pressure operated devices,
a single fluid line supplying all of said fluid pressure operated devices,
said pilot system and said control valve means being solely controlled and operated through said single fluid line; and
said pilot system comprising actuator means turnable about an axis to different azimuthal positions from each of which it can be moved axially to actuate a different selection of one or more of said control valves, means to turn said actuator means to the desired position, and means to move said actuator axially when in the desired position.

12. Apparatus according to claim 11 including means responsive to fluid pressure for moving said actuator means to three different axial positions according to the pressure, including one extreme position in which the actuator means actuates the selected one or more control valves corresponding to the azimuthal position of the actuator means, and first and second indexing positions in which said selected one or more control valves is not actuated by said actuator means, and positioning means actuated by movement of said actuator means axially between said first and second indexing positions to turn said actuator means about said axis to different azimuthal positions.

13. Apparatus for remotely operating a plurality of valves comprising;
a remote pressure source,
valve operators attached to a plurality of valves,
control valves to control opening and closing of said valves by allowing or preventing flow from said pressure source to said valve operators,
pilot control adapted to activate any selected one or more of said control valves without structural alteration of said pilot control and in no predetermined activation sequence with any other said control valve, and
single conduit means connecting said remote pressure source to said valve operators and said pilot control, said pilot control and said valve operators being remotely controlled and operated only by pressure emanating from said pressure source through said single conduit means.

14. Apparatus comprising:
a plurality of fluid pressure operated devices, control valve means to control the fluid for operation of said devices, a pilot system adapted to selectively operate said control valve means to cause fluid to flow to any one of various combinations of said fluid pressure operated devices without structural rearrangement of said pilot system and without a predetermined operation sequence of any other of said fluid pressure operated devices, and a single fluid line supplying all of said fluid pressure operated devices, said pilot system and said control valve means being solely controlled and operated through said single fluid line.

15. Apparatus for remotely operating a plurality of valves comprising a remote pressure source, valve operators attached to a plurality of valves, control valves to control opening and closing of said valves by allowing or preventing flow from said pressure source to said valve operators, pilot control adapted to activate any selected one or more of said control valves without structural alteration of said pilot control and in no predetermined activation sequence with any other said control valve, and single conduit means connecting said remote pressure source to said valve operators and said pilot control;

said pilot control and said valve operators being remotely controlled and operated only by pressure emanating from said pressure source through said single conduit means;

said pilot control comprising actuating means that is movable to a plurality of different positions adapted in each of said positions for further movement for actuating a different one or more of said control valves without actuating non-selected one or more of said control valves and positioning means for moving said actuating means to the desired position.

16. Apparatus for operating a selected one of a plurality of values, comprising a valve operator operably connected to each of said plurality of valves; and control means operably engageable with each of said valve operators to cause actuation thereof, said control means including a source of fluid pressure at a first pressure and at a higher pressure, stepping means operable in response to fluid pressure pulses from said source at said first pressure level to be indexed in steps to and from actuation positions for each of said valve operators, and actuation means operable in response to said higher fluid pressure level from said source to actuate a selected one of said valve operators, whereby said control means may be indexed to any one of said actuation positions by a plurality of pressure pulses at said first pressure level so that the valve operator corresponding to said one actuation position may be actuated by application of said higher fluid pressure.

17. Apparatus for operating a selected one of a plurality of valves, comprising a valve operator operably connected to each of said plurality of valves, and control means operably engageable with each of said valve operators to cause actuation thereof, said control means including a source of fluid pressure at a first pressure and at a higher pressure, and actuation means operable in response to fluid pressure at said first pressure level to index to a position for actuating one of said valve operators and operable in response to fluid pressure at said higher pressure level to cause actuation of said one of said valve operators.

18. Apparatus as defined by claim 17 wherein said control means includes a pilot valve connected between said source and each valve operator, and means on said pilot valve operably engageable by the actuation means when the actuation means has been indexed to the position corresponding to the pilot valve and said higher pressure has been applied to allow flow of said higher pressure fluid to the valve operator to which it is connected.

19. A method for operating a selected one of a plurality of fluid operated valves, comprising controlling the flow of operating fluid to said valves by a control device, indexing the control device by the application of a series of pressure pulses at a first pressure level to a position for providing operating fluid for said one valve, and applying fluid pressure to the control device at a higher pressure level to actuate the control device to allow operating fluid to flow to said one valve.

* * * * *